United States Patent [19]

Aubrey et al.

[11] Patent Number: 4,553,188
[45] Date of Patent: Nov. 12, 1985

[54] SECTIONALIZER

[75] Inventors: David R. Aubrey, Chester; Stephen J. Kearley, Merseyside, both of England

[73] Assignee: The Electricity Council, England

[21] Appl. No.: 497,938

[22] Filed: May 25, 1983

[30] Foreign Application Priority Data

May 28, 1982 [GB] United Kingdom ............... 8215641

[51] Int. Cl.⁴ ............................................. H02H 3/07
[52] U.S. Cl. ..................................... 361/115; 361/71; 361/93
[58] Field of Search ................... 361/93, 98, 100, 110, 361/115, 71, 72, 73, 74, 75

[56] References Cited

U.S. PATENT DOCUMENTS

| | | | |
|---|---|---|---|
| 1,954,849 | 4/1934 | Seese | 361/93 |
| 1,982,986 | 12/1934 | Garlington | 335/26 |
| 2,053,445 | 9/1936 | Rose | 361/93 |
| 3,418,529 | 12/1968 | Attewell | 361/13 |
| 3,818,275 | 6/1974 | Shimp | 361/100 |

FOREIGN PATENT DOCUMENTS

| | | |
|---|---|---|
| 631671 | 12/1927 | France . |
| 1533478 | 7/1968 | France . |
| 1542556 | 10/1968 | France . |
| 2418536 | 2/1979 | France . |
| 667068 | 2/1952 | United Kingdom . |
| 1076773 | 7/1967 | United Kingdom . |
| 1109320 | 4/1968 | United Kingdom . |
| 1183482 | 3/1970 | United Kingdom . |
| 1500765 | 2/1978 | United Kingdom . |
| 2016210 | 9/1979 | United Kingdom . |
| 222994 | 10/1984 | United Kingdom . |

OTHER PUBLICATIONS

"Autoreclose-Circuit Design for Large Substations Using Logic Sequence Switching", Published in the Proceedings of the IEE in Dec. 1967.

Primary Examiner—Harry E. Moose, Jr.
Assistant Examiner—Hong K. Choe
Attorney, Agent, or Firm—Beveridge, De Grandi & Weilacher

[57] ABSTRACT

A method of isolating a spur line of an electrical power system protected by a multi-shot resetting circuit breaker wherein at least two successive current surges in the spur line which activate the circuit breakers are detected. In response to the detection the spur line is isolated during a subsequent current dead period.

A sectionalizer is described for isolating a spur line of an electrical power system protected by a multi-shot resetting circuit breaker. The sectionalizer comprises a metal casing 22 providing a current path across a fuse mounting 10 while the sectionalizer is in a conducting position. An electrical circuit 23 inside the tube detects at least two successive current surges in the casing and during the following dead period actuates a chemical actuator 14 to trip the sectionalizer out of its conducting position.

9 Claims, 12 Drawing Figures

SECTIONALIZER

This invention relates to a sectionaliser for isolating a permanent fault in an electrical power distribution system.

More particularly, but not exclusively, this invention relates to a sectionaliser for the protection of 11 kV overhead lines. In a typical overhead electrical power distribution system the power lines are arranged in dendritic structure, with many branch lines, normally referred to as spur lines, emanating from a main supply line. With such an arrangement of power lines, it is possible to isolate a spurline from the rest of the system without disturbing the rest of the system. The possibility of isolating a faulty spur line thus exists within this arrangement.

Normally, a power distribution system as described above will be provided, near the power source, with overload and fault protection in the form of a reclosing circuit breaker, which will trip and isolate the whole system from the power source, if a current surge of sufficient magnitude occurs within the system. As the circuit breaker is of the reclosing type, then when a characteristic reset time after tripping has elapsed the circuit breaker recloses. Thus there is a current dead period throughout the system between opening and reclosing of the circuit breaker. Often the circuit breaker has a multi-shot reclosing facility, which means that the breaker recloses more than once before locking out.

Further protection for such a system is often provided by pole mounted expulsion fuses. These comprise a fuse link mounted across an otherwise insulated gap. The fuse link is contained by a non metallic tube which is held in position across the gap by a simple mechanism which itself is latched by the intact fuse link. As a consequence, the fuse link is in tension. The fuse link of an expulsion fuse is provided with a fuse element which melts when a sufficiently large current surge flows within the fuse. By the melting of the fuse element, the circuit is broken physically, but not yet electrically, and arcing commences within the tube. Arcing persists for typically 10 ms to 100 ms and can be accompanied by a loud explosion from within the tube which can cause flame and hot gas to be emitted for up to 2 m out of each end of the tube. By the melting of the fuse element the tube is unlatched from the fuse mount, but arcing starts and ends with the tube in largely the closed position while yet a fair electrical contact remains between the top of the tube and the top contact of the fuse mount. As arcing ends the top of the tube continues to fall away from the top of the fuse mount and finally the tube hangs inverted from the bottom of the fuse mount thus providing an isolating distance and a visual indication to a linesman nearby that the fuse has blown.

In distribution networks, many types of protection are used. One known as the "Group fused system" is in extensive use for example for 11 kV overhead line networks. In such a system, at a substation, a circuit breaker, typically an oil filled automatically reclosing circuit breaker, is provided in each outgoing supply circuit. This circuit feeds power to various branches. Each branch or group of branches may be single phase or three phase and have respectively two or three fuses for protection. Such an arrangement is one example of the use of fuses and circuit breakers in series. The reason for employing such an arrangement with both fuses and circuit breakers is so that, for a permanent fault, a fuse will isolate the fault containing part of the network whilst, for a transient fault, the circuit breaker will open for sufficient time for the fault to clear. A permanent fault is one where damage occurs and is usually associated with a short circuit condition. A transient fault is one which is capable of complete self-extinction if the flow of fault current is broken for a short time. These faults are often caused by local breakdowns due to lightning induced voltages on the lines. It is desirable that a transient fault should be dealt with by opening and automatic reclosing of the circuit breaker. If a permanent fault occurs however on one of the remote feeders, then it is undesirable that the main circuit breaker should remain permanently open, and for this reason, fuse protection for individual branches of the network or small groups of branches is desirable. If a fuse ruptures then a small region only of the network is disconnected. It is undesirable however that the fuse should rupture if a transient fault occurs which can be dealt with by the main circuit breaker. For this reason, the performance of the fuses and the circuit breakers have to be suitably matched.

When a fault occurs it is not initially known whether it is permanent or transient. A suitable sequence of operations therefore is therefore that the main circuit breaker should, in all instances, open and reclose again after a few seconds. If the fault no longer remains, then it was a transient fault which has been extinguished. If the fault still persists, the breaker is left closed to allow a fuse to rupture. In order that these alternatives are available to the protective equipment, no fuse should rupture before the breaker initially opens.

The disadvantages of the above-described system are that, the performances of the fuses and circuit breakers cannot always be suitably matched, the fuses require expensive maintenance to ensure their interrupting capabilities, fuses can be very noisy when they interrupt, and fuses can cause fires by expelling hot particles during interruption.

In accordance with the present invention there is provided a method of isolating a spur line of an electrical power distribution system from a main line of the system, the main line being protected from current overload by a multishot resetting circuit breaker, comprising detecting at least two successive current surges in the spur line and then in response thereto isolating the spur line during a subsequent current dead period.

Preferably the second current surge is detected only if it occurs within a predetermined reclaim period following the first surge current. The method may further comprise, in response to the detection of the surge currents, waiting for a predetermined continuous hold period to elapse, during which the current in the spur line remains below a preset limit, and in response thereto isolating the spur line.

This invention also provides a sectionaliser for isolating a spur line of an electrical power distribution system from a main line of the system, which is protected from current overload by a multi-shot reclosing circuit breaker, the sectionaliser comprising means providing a current path through the sectionaliser when closed, means for detecting at least two successive current surges through the sectionaliser followed by a current dead period and an actuating means responsive to detection of said successive current surges to actuate the sectionaliser to break the current path during the subsequent current dead period.

Preferably said means for detecting includes a current transformer coupled to said current path means and a logic circuit connected to the current transformer arranged to register said current surges.

The logic circuit may be arranged to derive its power supply from the current transformer output. Preferably the logic circuit is not normally energised, and is arranged to be energised in response to a current flowing in said current path means in excess of a predetermined limit for the duration of said hold period.

Preferably the actuating means comprises a current transformer coupled to said current path means, a discharge capacitor, a rectifier connecting the output of the current transformer to charge up the capacitor, a chemical actuator which can be electrically fired to break the current path through the sectionaliser and a discharge switch responsive to an actuate signal from the means for detecting to discharge the capacitor to fire the chemical actuator.

The sectionaliser may comprise a sectionaliser module and a selected one of an expulsion fuse mount or a mount specifically designed for a sectionaliser module in which the sectionaliser module is mounted to provide said current path and is expelled to break said path.

Preferably the sectionaliser module comprises two end fittings, to co-operate with the expulsion fuse mount, and interconnected by a hollow metal tube providing said current path. The logic circuit may be located within the metal tube. The current transformer may be situated around the metal tube.

Examples of this invention will be described with reference to the accompanying drawings, in which.

Figure 1:
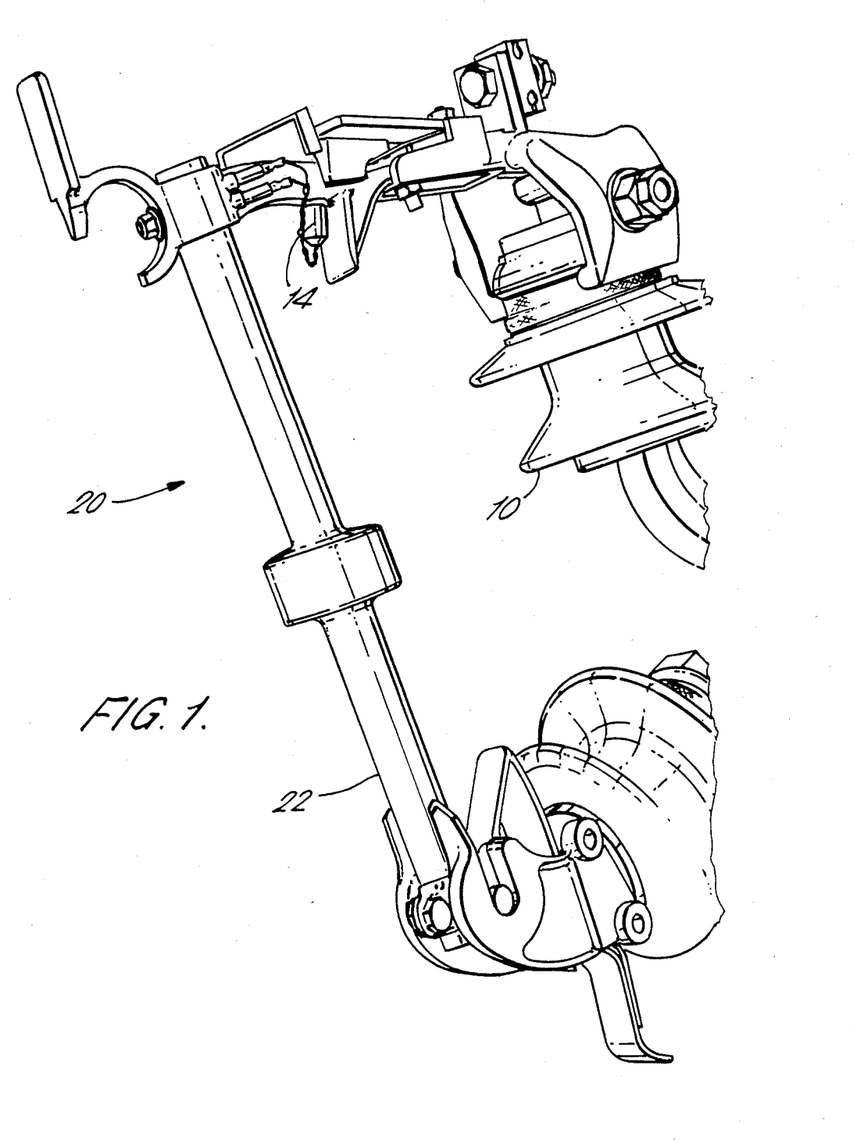
FIG. 1 shows a perspective view of an embodiment of sectionaliser.

A sectionaliser, as shown in FIG. 1, consists of an expulsion fuse mount 10 of known type, in which is mounted a sectionaliser module 20. The sectionaliser is of a type suitable for use in isolating faulty spur lines from the main line in an overhead electrical power distribution system. This sectionaliser is designed to operate primarily in a power distribution system in which the main line is provided with a multi-shot reclosing circuit breaker.

The fuse mount 10 shown in FIG. 1 is of a type designed and manufactured by G.E.C.

Figure 2:
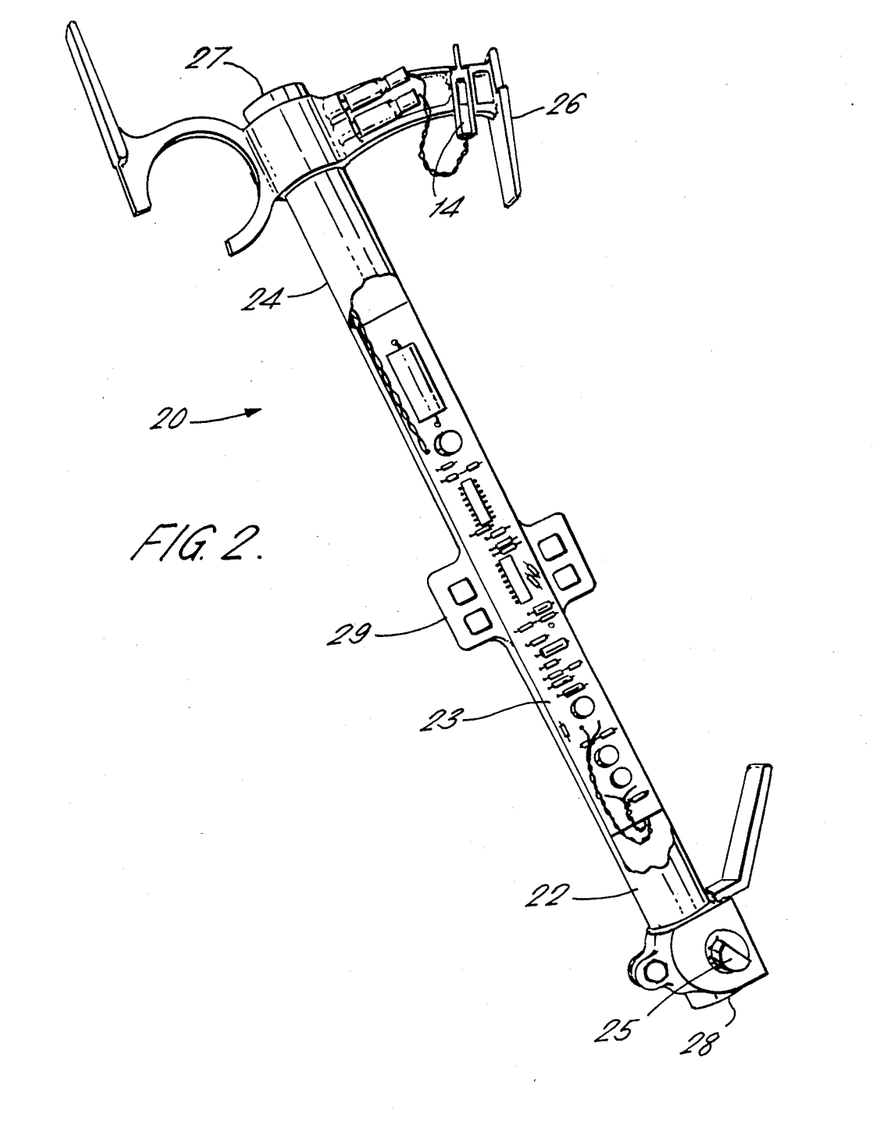
FIG. 2 shows the sectionaliser module of FIG. 1 separated from the fuse mount.

The sectionaliser module 20 comprises a metal casing 22, inside which is situated an electronic circuit 23 (FIG. 2). The metal casing 22 forms the current path across the fuse mount 10, but only whilst the sectionaliser module 20 is in the conducting position shown in FIG. 1.

The casing 22 consists of a copper tube 24, at the ends of which are provided end fittings 25 and 26. End fittings 25 and 26 serve to attach each end of the sectionaliser module 20 to the fuse mount 10, and are designed so that through-current does not have to flow through any pivots.

End fitting 25 is such as to allow the sectionaliser module 20 to rotate about fitting 25, when end 28 of the module is fixed to the fuse mount 10, and end 27 is not fixed.

End fitting 26 which is situated at end 27 of the sectionaliser module, is provided with a chemical actuator 14, and is such that fitting 26 attaches end 27 to the fuse mount 10 until such a time as chemical actuator 14 is fired. When this firing occurs, end fitting 26 is made to disengage from the fuse mount 10. Since end 27 is above end 28 whilst the sectionaliser module 20 is fixed in the conducting position, when end fitting 26 disengages from the fuse mount 10, the sectionaliser module rotates about end fitting 25. As end 27 moves further and further from the fuse mount 10, so a larger and larger gap is formed in the current path. Thus when sectionaliser 20 has swung completely away from its conducting position, there is left a large air gap across the fuse mount 10, which forms a very effective isolation, and so this new position of the sectionaliser 20 may be termed the isolating position.

Figures 3, 4:
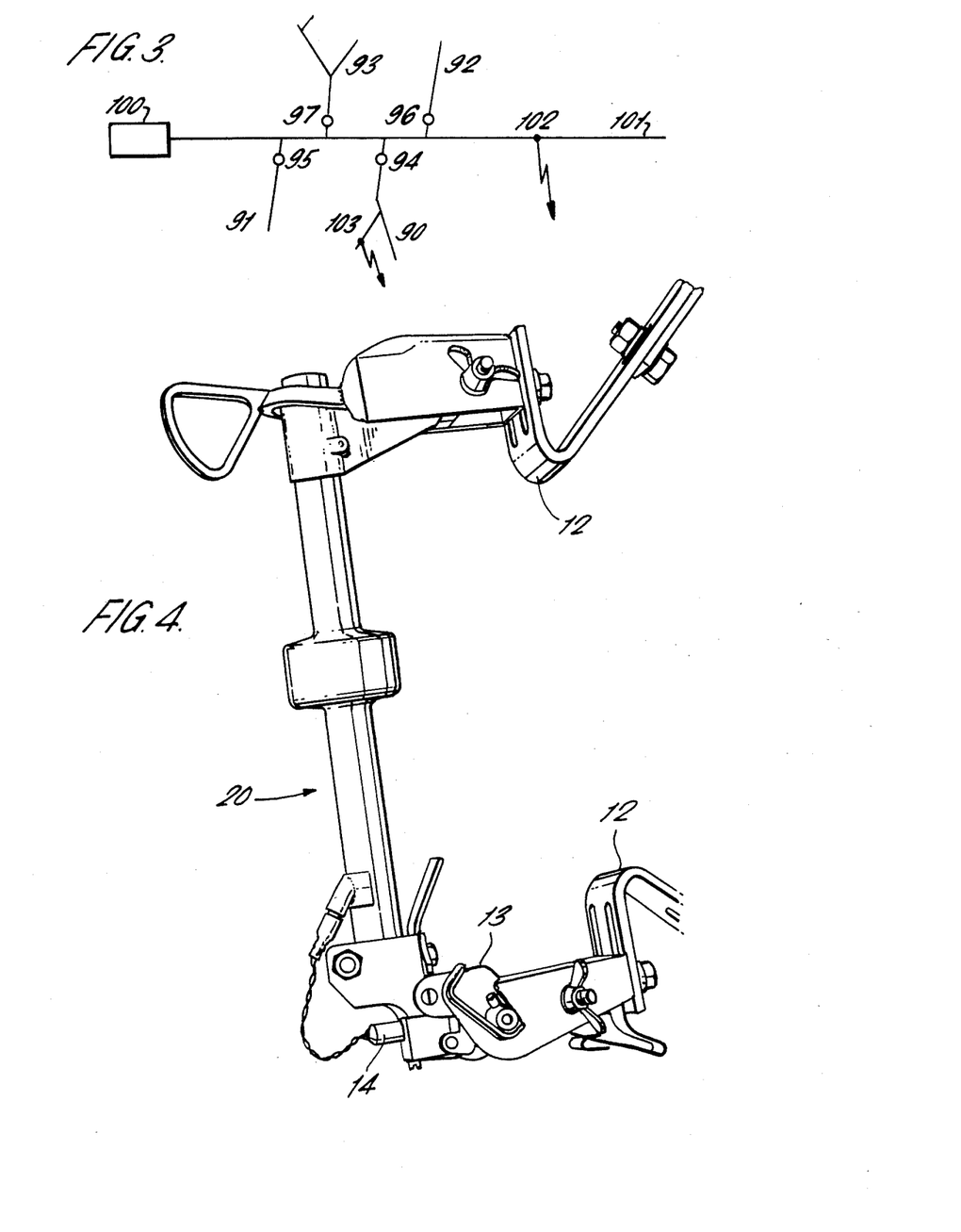
FIG. 3 is a diagramic representation of part of an overhead electrical power distribution system equipped with sectionalisers.
FIG. 4 shows an alternative embodiment of the sectionaliser.
Figure 5A:
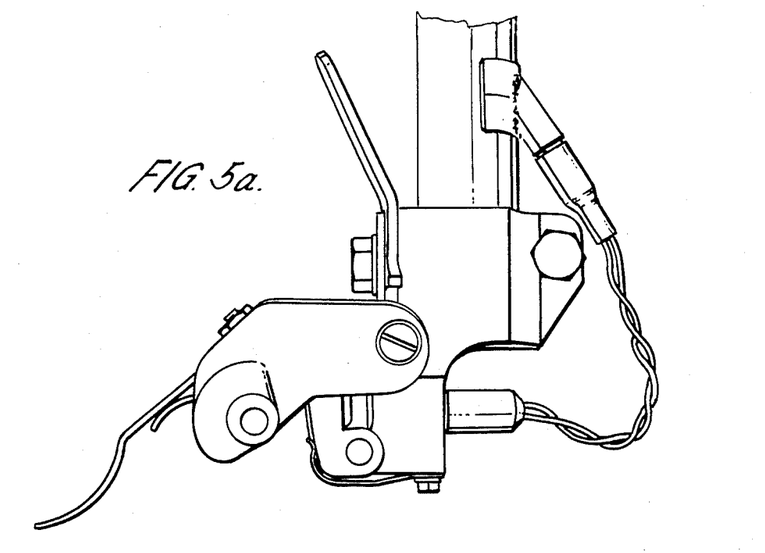
FIGS. 5a and 5b show the release mechanism of the sectionaliser of FIG. 4 in the latched and unlatched states respectively.
Figure 5B:
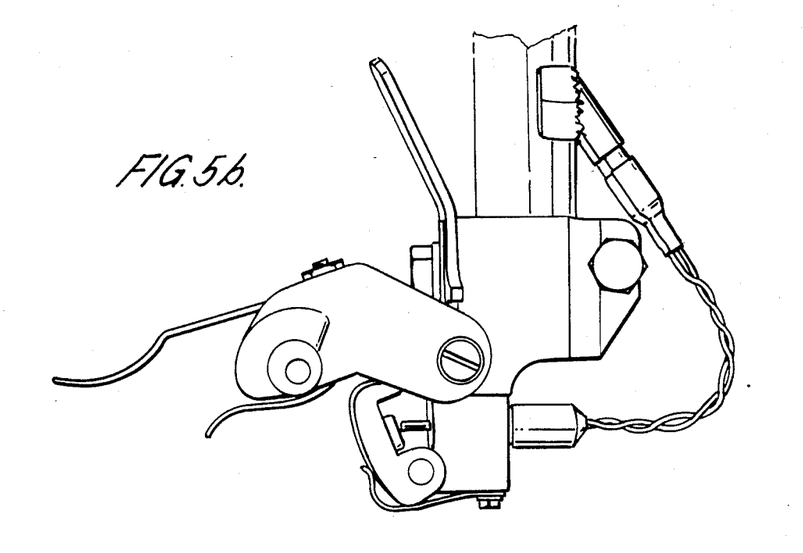

An alternative fuse mount 12 is shown in FIGS. 4, 5a and 5b. In FIG. 4 the sectionaliser module 20 is of basically similar design, although with different end fittings to suit the different fuse mount 12.

The release mechanism 13 is shown in its latched and unlatched positions in FIGS. 5a and 5b. The essential features are that the actuator 14 unlatches a sprung toggle which again releases a sprung contact in the main current path to allow the mechanism to collapse. When the actuator is replaced, a linesman simply has to press on one side of the mechanism for it to be locked again.

Figure 6:
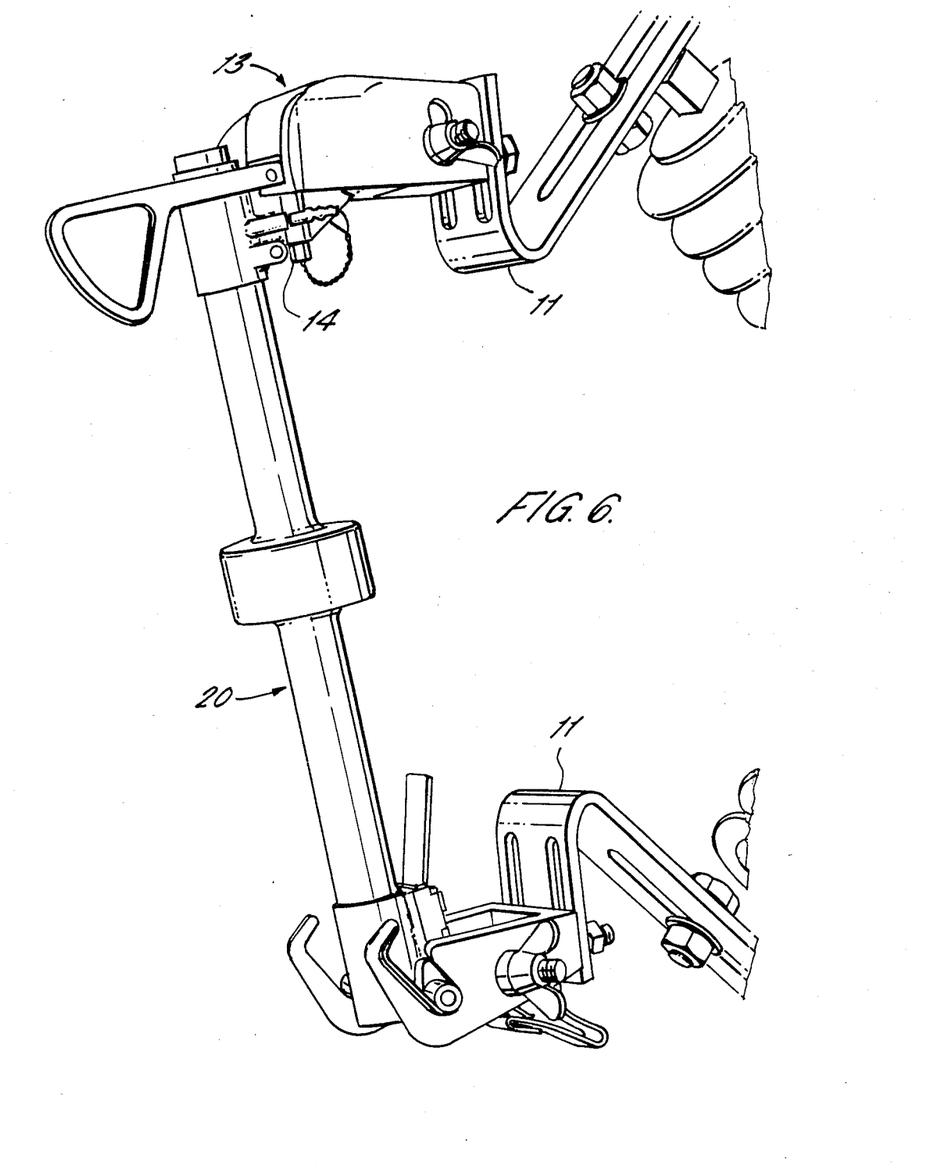
FIG. 6 shows a third embodiment of the sectionaliser.
Figure 7A:
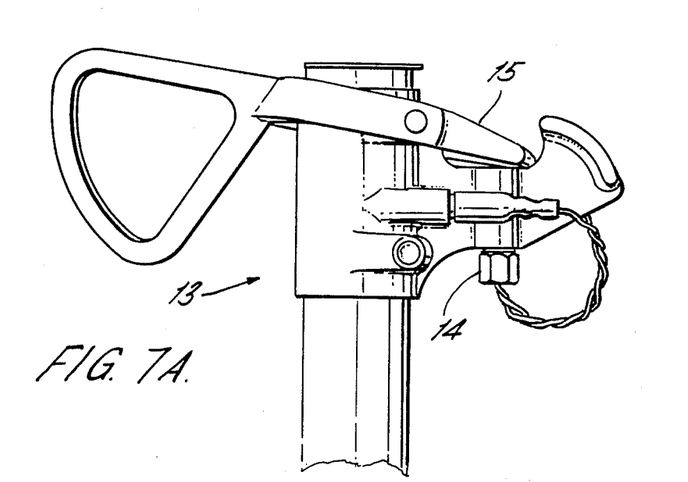
FIGS. 7a and 7b show the release mechanism of the sectionaliser of FIG. 4 in the latched and unlatched states respectively.
Figure 7B:
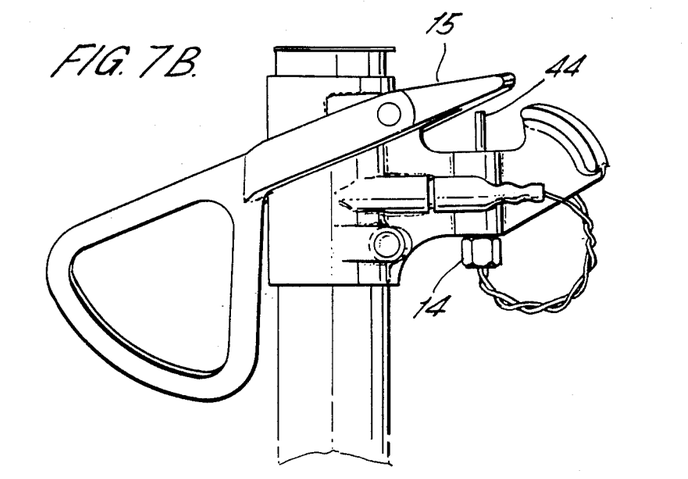
Figure 8:
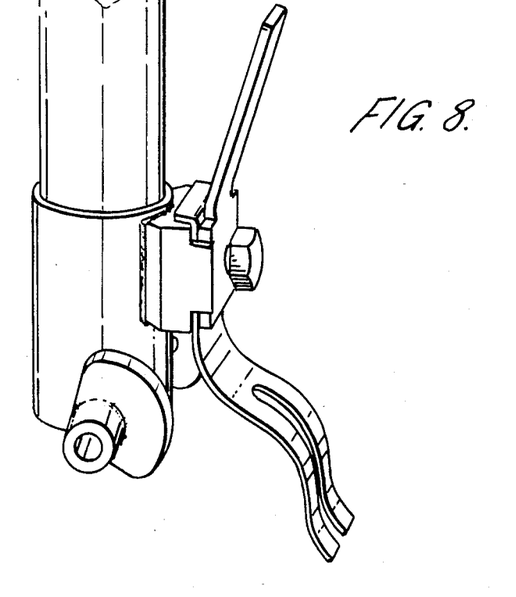
FIG. 8 shows the pivoted end of the sectionaliser of FIG. 6.

A third alternative fuse mount 11 is shown in FIGS. 6, 7a and 7b. In FIG. 6 the sectionaliser module 20 has similar fittings to that of FIG. 4, but the chemical actuator 14 is situated at the upper end of the sectionaliser.

The release mechanism 13 is shown in its latched and unlatched positions in FIGS. 7a and 7b. When the chemical actuator is operated, the pivoted handle 15 is forced upwards. This movement duplicates the movement for manual release, and effectively unlatches the top end of the sectionaliser.

Figure 9:
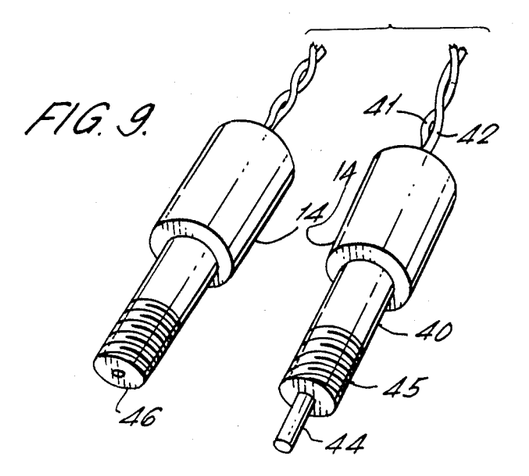
FIG. 9 shows two chemical actuators respectively in pre-fired and fired form as used in the sectionalisers of FIGS. 1, 4 and 6.

The chemical actuator 14 consists of a hollow cylindrical metal body 40, as shown in FIG. 9. This metal body contains a small explosive charge. Two electrical wires 41 and 42 pass through one end of the body 40, and into the explosive charge, so that when a current is passed through these wires, the explosive charge detonates.

The end of metal body 40 through which the wires 41 and 42 pass is encased in a cylindrical plastic cap 43. About the curved surface of body 40 adjacent to the other end 46 of that body, is a screw thread 45 which is used to attach chemical actuator 14 to end fitting 26.

At the same end as the screw thread 45 on the body 40, is situated a driving pin 44. When the explosive charge is detonated, the driving pin 44 is driven out of the end 46 of body 44, this movement of the driving pin being the mechanical movement which causes the end fitting 26 to disengage from fuse mount 10.

Figure 10:
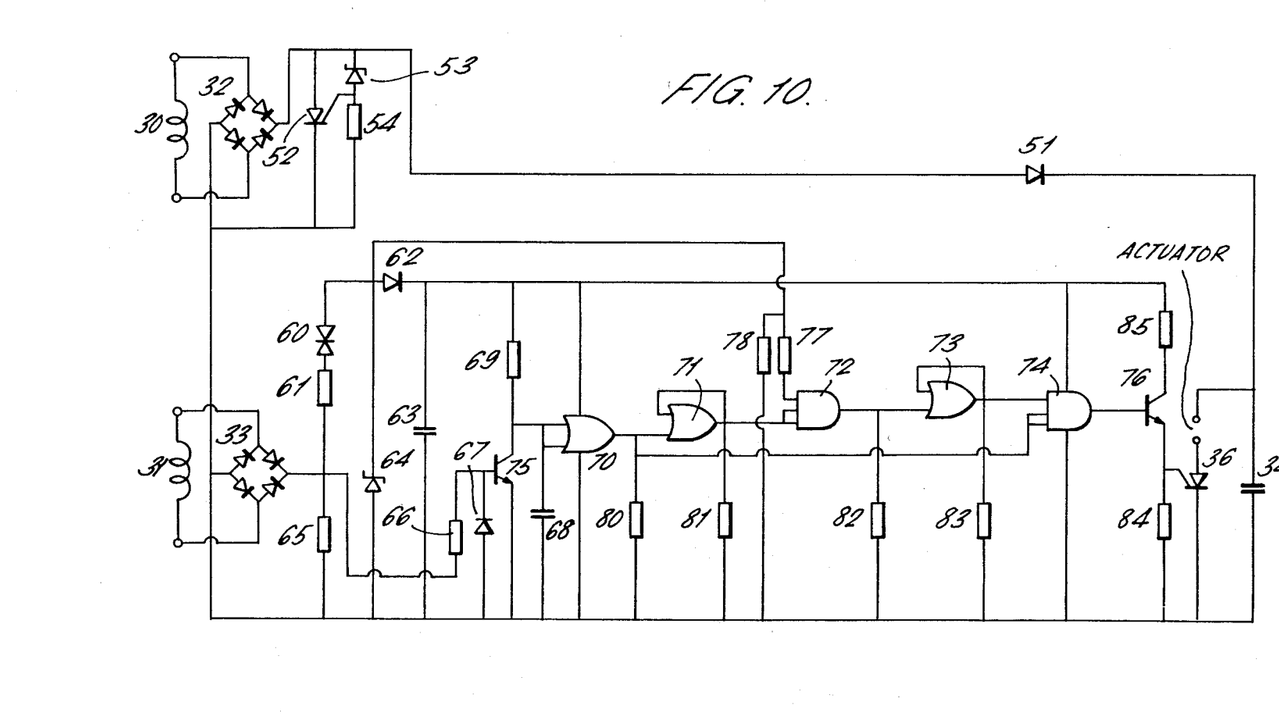
FIG. 10 shows the electronic circuit of the sectionaliser of FIGS. 1, 4 and 6.

Within the casing 22 is an electronic circuit 23. This electronic circuit is energised via two current transformers 30 and 31 (FIG. 10). These transformers are situated within a cylindrical housing 29, about the centre of tube 24.

The output of transformers 30 and 31 are separately rectified by rectifiers 32 and 33 respectively.

The D.C. output from rectifier 32 is used to charge up reservoir capacitor 34, via diode 51, which capacitor supplies at the desired time the current discharge which fires the chemical actuator 14. The diode 51 prevents reservoir capacitor 34 discharging when the D.C. voltage output from rectifier 32 falls below the voltage across the reservoir capacitor. Thyristor 52, controlled by zener diode 53 limits the voltage supplied to capacitor 34 to 56 volts.

The current transformer 31 and the bridge rectifier 33 provide the D.C. supply to the remainder of the circuit. A current surge through the sectionaliser is detected by a sub-circuit comprising components 60 to 65. Thus when the current flowing in the primary of current transformer 31 exceeds a predetermined value, called the pick up current, the voltage developed by the secondary of transformer 31 is sufficient to raise the voltage across Diac 60 to above its triggering voltage. Capacitor 63 is then charged via resistor 61, Diac 60 and diode 62. The voltage across capacitor 63 is limited by a zener diode shunt stabilizer 64 to 12 volts. The charge held by capacitor 63 provides the power supply for logic gates 70 to 74, and for transistors 75 and 76. The value of the pick up current is determined by resistor 65.

When a charge has appeared on capacitor 63, then a voltage will appear between the collector and the emitter of transistor 75. The base of transistor 75 is connected to the rectified output of the secondary of transformer 31 via resistor 66 and clamping diode 67. Transistor 75 is thus switched at a rate of 100 Hz, which holds the charge on capacitor 68 to a maximum of 1 volt, by constantly discharging it through transistor 75. When the current in the primary of transformer 30 falls below 0.7 amps, however, transistor 75 will no longer be repeatedly switched on, and the voltage across capacitor 68 will rise, being charged from the supply rail through resistor 69.

The time constant of resistor 69 and capacitor 68 is such that capacitor 68 will have reached 4 volts in approximately 100 ms, 4 volts being the input voltage level at which OR-gate 70 will switch. Thus approximately 100 ms after transistor 75 stops switching on, the input voltage level to OR-gate 70 will have risen sufficiently that the output of this gate will switch to logic 1, which in turn will trigger OR-gate 71 to output a logic 1. OR-gate 71 is connected so as to latch in this 'on state' i.e. outputting a logic one, and thus the information of a current surge followed by a drop to a minimal current in the sectionaliser is effectively stored by OR-gate 71. The values of 100 milliseconds and 0.7 amps may of course vary substantially without affecting the principle of operation.

If current starts to flow in the sectionaliser again, i.e. because the circuit breaker has reclosed, and this current remains below the pick up current, then capacitor 63 will slowly discharge through resistors 80 to 83, and the logic gates 70–74 will become uncharged. This discharge period is called the reclaim time, which in this instance is set at about 25 seconds.

If, however, when the circuit breaker recloses, the current through the sectionaliser exceeds the pick up current before 63 has discharged, then since the output of OR-gate 71 is a logic 1, then the output of AND-gate 72 will rise to a logic 1 under the influence of a high input via resistor 77.

A logic 1 output from AND-gate 72 will cause OR-gate 73 to output a logic 1. OR-gate 73 is connected in a similar fashion to OR-gate 71, and so OR-gate 73 stores the information concerning a second current surge. When the current next drops below 0.7 amps, transistor 75 will again stop switching, the voltage across capacitor 68 will rise, and after a delay of 100 ms, OR-gate 70 will again output a logic 1. All the inputs to AND-gate 74 are now logic 1's and so gate 74 will output a logic 1, which is fed to the base of transistor 76. This voltage rise supplied to the base of transistor 76 switches the transistor on, which causes a current to flow to the gate of thyristor 36, thus triggering thyristor 36 to discharge capacitor 34 to operate the chemical actuator.

The reaction of a sectionaliser to various faults in an overhead electrical power distribution system is as follows, making reference to FIG. 3.

The main line 101 is protected by a ground mounted multi-shot reclosing circuit breaker 100 with available three instantaneous trips separated by two decided times of 5 seconds each. From this main line are a number of spur lines 90, 91, 92 and 93. Each spur line is provided adjacent its connexion with the main line 101, sectionalisers at 94, 95, 96 and 97.

A transient or permanent main line fault, at say 102, will not affect any sectionaliser and will simply cause the circuit breaker 100 to respond in the conventional manner. For a permanent main line fault the breaker would perform three trips to lock-out. A transient spur line fault, at say 103, will be seen by one or more of the sectionalisers 94, but would not cause any of them to operate. Suppose that the fault 103 is a transient redearth fault. Shortly after the commencement of the fault, the sectionaliser in the red phase detects the passage of fault current via its current transformer 31 and remembers, for a short while, that an excessive current was present. The breaker 100 via its own relays, trips and then remains open for 5 seconds. When the breaker recloses normal load current flows because the cause of the fault no longer exists, and the sectionaliser 94, after a number of seconds—the sectionaliser reclaim time—forgets the event.

When a spur line permanent fault occurs, say at 103 and again red-earth, the red sectionaliser goes through its complete sequence. Again, shortly after the commencement of the passage of fault current, the sectionaliser detects and remembers, and the circuit breaker trips. When the breaker 100 now recloses after the first dead time, fault current flows again into the fault. The sectionaliser 94 sees now a second period of fault current and remembers this second event. Almost immediately the breaker 100 trips again on instantaneous and starts its second dead time. Critically now, the sectionaliser detects a period of about 100 ms during which the current is less than 0.7 amps and unlatches.

Even though sectionalisers can be used instead of fuses, sectionalisers can also be used with fuses on the same area of network and, in addition, sectionalisers can be used beyond pole mounted reclosing circuit breakers where fuses generally cannot.

We claim:

1. A sectionaliser for isolating a spur line of an electrical power transmission system from a main line of the system, the main line being protected from current overload by a multi-shot resetting circuit breaker, the sectionaliser comprising means providing a current path through the sectionaliser when closed, means for detecting at least two successive current surges through the sectionaliser followed by a current dead period, and an actuating means responsive to detection of said successive current surges to actuate the sectionaliser to break the current path through the sectionaliser during the subsequent current dead period, said means for detecting including a current transformer coupled to said current path means and a logic circuit connected to the current transformer for registering the current surges, the sectionaliser being formed as a sectionaliser module and a mount having physically spaced connection points between which the sectionaliser module is mounted to provide said current path and from which the sectionaliser module is expelled to break said path, the sectionaliser module comprising two end fittings co-operating with the spaced connection points of the mount and a hollow metal tube interconnecting the end fittings and providing said current path, said logic circuit being located within the metal tube.

2. A sectionaliser as claimed in claim 1 wherein the logic circuit is arranged to derive its power supply from the current transformer output.

3. A sectionaliser as claimed in claim 1 wherein the logic circuit is not normally energised and is arranged to be energised in response to a current flowing in said current path means in excess of a predetermined pick-up current level.

4. A sectionaliser as claimed in claim 3 wherein said predetermined pick-up current level is set above the level of maximum normal non-fault service current through the sectionaliser and the logic circuit is arranged to register and log a current surge on being energised.

5. A sectionaliser as claimed in claim 4 wherein the logic circuit is arranged to retain the current surge logging for a predetermined reclaim period following the current flowing in said current path falling below the pick-up current level, whereby only a further current surge before the end of said reclaim period is logged as a second current surge.

6. A sectionaliser as claimed in claim 1 wherein the logic circuit includes means for signalling the actuating means to break the current path when said subsequent current dead period has exceeded the duration of a predetermined hold period.

7. A sectionaliser as claimed in claim 6 wherein the logic circuit is arranged to signal the actuating means when the current flowing in the current path means has remained continuously below a predetermined limit for the duration of said hold period.

8. A sectionaliser as claimed in claim 1 wherein the actuating means comprises a current transformer coupled to said current path means, a discharge capacitor, a rectifier connecting the output of the current transformer to charge up the capacitor, a chemical actuator which can be electrically fired to break the current path through the sectionaliser and a discharge switch responsive to an actuate signal from the means for detecting to discharge the capacitor to fire the actuator.

9. A sectionaliser as claimed in claim 1 in which the current transformer is situated around the metal tube of the sectionaliser module.

* * * * *